United States Patent
Wu (10) Patent No.: US 9,974,114 B2
(45) Date of Patent: May 15, 2018

(54) METHOD AND APPARATUS FOR HANDLING RELEASE OF SIMULTANEOUS COMMUNICATION WITH MULTIPLE BASE STATIONS AND RELATED COMMUNICATION DEVICE

(71) Applicant: HTC Corporation, Taoyuan (TW)

(72) Inventor: Chih-Hsiang Wu, Taoyuan (TW)

(73) Assignee: HTC Corporation, Taoyuan (TW)

(*) Notice: Subject to any disclaimer, the term of this patent is extended or adjusted under 35 U.S.C. 154(b) by 26 days.

(21) Appl. No.: 14/872,161

(22) Filed: Oct. 1, 2015

(65) Prior Publication Data
US 2016/0100418 A1 Apr. 7, 2016

Related U.S. Application Data

(60) Provisional application No. 62/058,676, filed on Oct. 2, 2014.

(51) Int. Cl.
H04W 76/38 (2018.01)
H04W 72/04 (2009.01)

(52) U.S. Cl.
CPC ........... *H04W 76/38* (2018.02); *H04W 72/04* (2013.01); *H04W 76/15* (2018.02); *H04W 76/34* (2018.02)

(58) Field of Classification Search
CPC ... H04W 76/068; H04W 72/04; H04W 88/06; H04W 76/025
See application file for complete search history.

(56) References Cited

U.S. PATENT DOCUMENTS

| 9,538,575 | B2 * | 1/2017 | Yamada | H04W 76/046 |
| 2005/0063304 | A1 * | 3/2005 | Sillasto | H04W 76/068 370/229 |
| 2005/0243761 | A1 * | 11/2005 | Terry | H04W 28/06 370/328 |

FOREIGN PATENT DOCUMENTS

| AU | 2013248261 A1 | 11/2013 |
| JP | 2001-275168 A | 10/2001 |
| JP | 2007312393 A | 11/2007 |
| JP | 2014022895 A | 2/2014 |

(Continued)

OTHER PUBLICATIONS

ZTE, Discussion on user inactivity of ProSe UE[online], 3GPP TSG-RAN WG2 Meeting #87 R2-143600, <URL:http://www.3gpp.org/ftp/tsg_ran/WG2_RL2/TSGR2_87/Docs/R2-143600.zip>, Aug. 18-22, 2014.
Corresponding Japanese Office Action that these art references were dated Oct. 18, 2016.
3GPP TS 36.300 v12.3.0, "LTE; Evolved Universal Terrestrial Radio Access (E-UTRA) and Evolved Universal Terrestrial Radio Access Network (E-UTRAN)" ETSI TS 136 300 V12.3.0 (Sep. 2014).

(Continued)

*Primary Examiner* — Mohammad S Anwar
(74) *Attorney, Agent, or Firm* — CKC & Partners Co., Ltd.

(57) ABSTRACT

A network node includes a communication interfacing unit and a processor. The processor operable to perform operations includes controlling the communication interfacing unit to establish at least one second RB with a secondary cell group (SCG) bearer type between the communication device and an auxiliary network node; and releasing one of the at least one second RB under a condition that, for a first time period, all of downlink data in at least one downlink buffer corresponding to the one of the at least one second RB is successfully transmitted or the at least one downlink buffer corresponding to the one of the at least one second RB is empty, and the auxiliary network node does not receive any request for an uplink grant allocation.

11 Claims, 6 Drawing Sheets

(56) References Cited

FOREIGN PATENT DOCUMENTS

JP 2014510462 A 4/2014

OTHER PUBLICATIONS

3GPP TSG-RAN WG2 Meeting #87bis, R2-144578, "Introduction of Dual Connectivity", Shanghai, China, Oct. 6-10, 2014.
NTT DOCOMO et al, "Introduction of Dual Connectivity", 3GPP Draft, R3-142122, vol. Ran WG3, no. Shanghai, China, Oct. 6-10, 2014, XP050871017, URL: http://www.3gpp.org/ftp/tsg_ran/WG3_lu/TSGR3_85bis/Docs/, retrieved on Sep. 30, 2014.
Award Solutions, Inc:"User Inactivity Monitoring", LTE University, Apr. 29, 2013 (Apr. 29, 2013), XP002752951, URL: http://lteuniversity.com/ask_the_expert/f/59/t/3276.aspx, [retrieved on Jan. 14, 2016], * Comment from Oct. 2, 2012 *.
Corresponding European Office Action that these art references were dated Feb. 3, 2016.
Ericsson, Inter-node RRC messages for dual connectivity, 3GPP TSG-RAN WG2 #86, Seoul, South Korea, R2-142405, pp. 1-7, May 9, 2014.
LG Electronics Inc., Stage 2 issues on Dual Connectivity Procedures, 3GPP TSG-RAN WG3 Meeting #83bis, San Jose Del Cabo, Mexico, R3-140698, pp. 1-5, Mar. 22, 2014.
Qualcomm Incorporated, *Secondary Carrier Activation* vs *Configuration*, 3GPP TSG-RAN WG4 AH#3, Bratislava, Slovakia, R4-102399, pp. 1-11, Jun. 25, 2010.
Corresponding Japanese Office Action dated May 9, 2017.

\* cited by examiner

METHOD AND APPARATUS FOR HANDLING RELEASE OF SIMULTANEOUS COMMUNICATION WITH MULTIPLE BASE STATIONS AND RELATED COMMUNICATION DEVICE

RELATED APPLICATIONS

This application claims priority to U.S. Provisional Application Ser. No. 62/058,676, filed Oct. 2, 2014, which is herein incorporated by reference.

BACKGROUND

Technical Field

The present invention relates to a method used in a wireless communication system and related communication device. More particularly, the present invention relates to a method of handling radio bearer addition and release for operation of dual connectivity and related communication device.

Description of Related Art

A long-term evolution (LTE) system supporting the 3GPP Rel-8 standard and/or the 3GPP Rel-9 standard are developed by the 3rd Generation Partnership Project (3GPP) as a successor of a universal mobile telecommunication system (UMTS) for further enhancing performance of the UMTS to satisfy increasing needs of users. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

An LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (COMP) or uplink (UL) multiple-input multiple-output (MIMO). For a UE and an eNB to communicate with each other in the LTE-A system, the UE and the eNB must support standards developed for the LTE-A system, such as the 3GPP Rel-10 standard or later versions.

BRIEF DESCRIPTION OF THE DRAWINGS

The invention can be more fully understood by reading the following detailed description of the embodiment, with reference made to the accompanying drawings as follows.

DETAILED DESCRIPTION

A UE in dual connectivity (i.e., a mode of a UE in RRC_CONNECTED) is configured with a Master Cell Group (MCG) and a Secondary Cell Group (SCG). In dual connectivity, a Master Cell Group is a group of serving cells associated with Master eNB (MeNB), including a Primary Cell (PCell) and optionally one or more Secondary Cells (SCells). In dual connectivity, the MeNB is an eNB which communicates with at least one MME and the UE. A Secondary Cell Group is a group of serving cells associated with a Secondary eNB (SeNB), including a Primary SCell (PSCell) and optionally one or more SCells. The SeNB is an eNB that provides additional radio resources for the UE. The SeNB is different from the MeNB.

When the UE is in dual connectivity, the UE performs transmissions and/or receptions (e.g. of data, packets, messages and/or control information) via both the MeNB and the SeNB. E-UTRAN supports dual connectivity operation whereby a UE with multiple receivers (RXs)/transmitters (TXs) in RRC_CONNECTED status is configured to utilize radio resources provided by two distinct schedulers, located in two eNBs.

When an UE in idle mode has data to send, the UE initiates a radio resource control (RRC) connection establishment to a first eNB (i.e. MeNB) to request entering RRC connected mode. The first eNB configures the UE an RRC connection and a first data radio bearer (DRB) to transmit and/or receive data. The first eNB further configures the UE a second DRB to transmit and/or receive data. The first DRB is an MCG bearer and the second DRB is an SCG bearer. In other words, the UE transmits and/or receives data via the second DRB to/from a second eNB (i.e. SeNB) while transmitting and/or receiving data via the first DRB to/from the first eNB.

Figure 1:
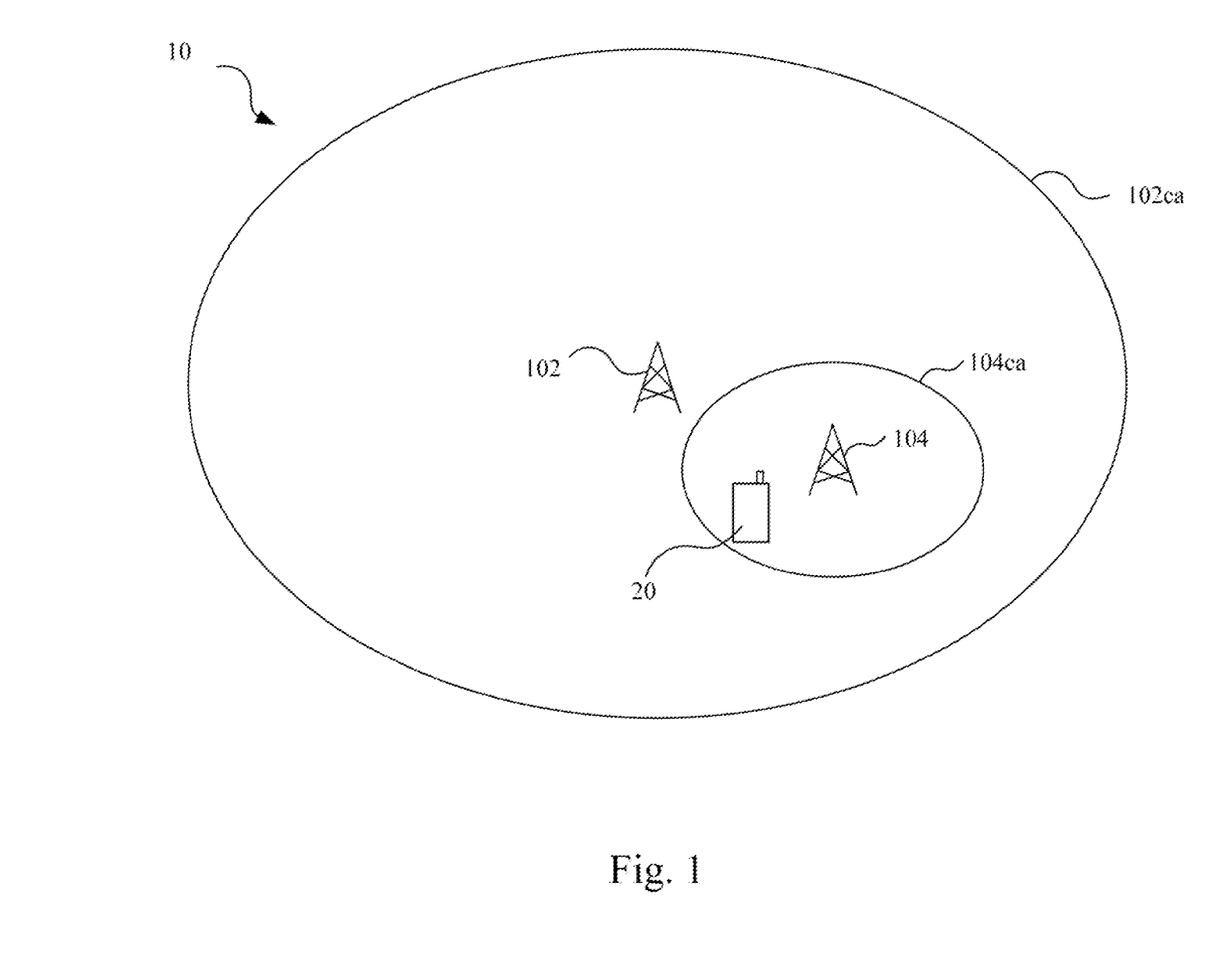
FIG. 1 is a schematic diagram of a wireless communication system according to one embodiment of the present disclosure.

FIG. 1 is a schematic diagram of a wireless communication system 10 according to an embodiment of the present disclosure. The wireless communication system 10 includes a communication device (e.g., a user equipment (UE) as described above) 20, a main network node (e.g., a macro cell base station (BS) or an MeNB) 102, and an auxiliary network node (e.g., a low-power BS or an SeNB) 104. In FIG. 1, the communication device 20, the main network node 102 and the auxiliary network node 104 and are simply utilized for illustrating the structure of the wireless communication system 10. Practically, the main network node 102 and/or the auxiliary network node 104 can be eNBs or relay stations in an evolved UTRAN (E-UTRAN) or fifth generation (5G) base stations. In addition, the auxiliary network node 104 may be a pica cell BS or a femto cell BS. In FIG. 1, the auxiliary network node 104 is in a coverage area 102*ca* of the main network node 102. In another example, the auxiliary network node 104 may be outside the coverage area 102*ca* of the macro BS 102, but the coverage areas 104*ca*, 102*ca* of the auxiliary network node 104 (e.g., a low-power BS) and the main network node 102 (e.g., a macro BS) are partly overlapped.

As shown in FIG. 1, the communication device 20 is in coverage areas 102*ca*, 104*ca* of the main network node 102 and the auxiliary network node BS 104. The communication device 20 communicates with the main network node 102 and the auxiliary network node 104 at the same time. That is, the communication device 20 performs a transmission/ reception via both a cell of the main network node 102 and a cell of the auxiliary network node 102. The communication device 20 can be a machine type communication (MTC) device, a mobile phone, a laptop, a tablet computer, an electronic book, a portable computer system, a vehicle or an airplane. In addition, the main network node 102/the auxiliary network node 104 and the communication device 20 can be seen as a transmitter or a receiver according to direction. For example, for an uplink (UL), the communication device 20 is the transmitter and the main network node 102/the auxiliary network node 104 is the receiver, and for a downlink (DL), the main network node 102/the auxiliary network node 104 is the transmitter and the communication device 20 is the receiver.

Figure 2:
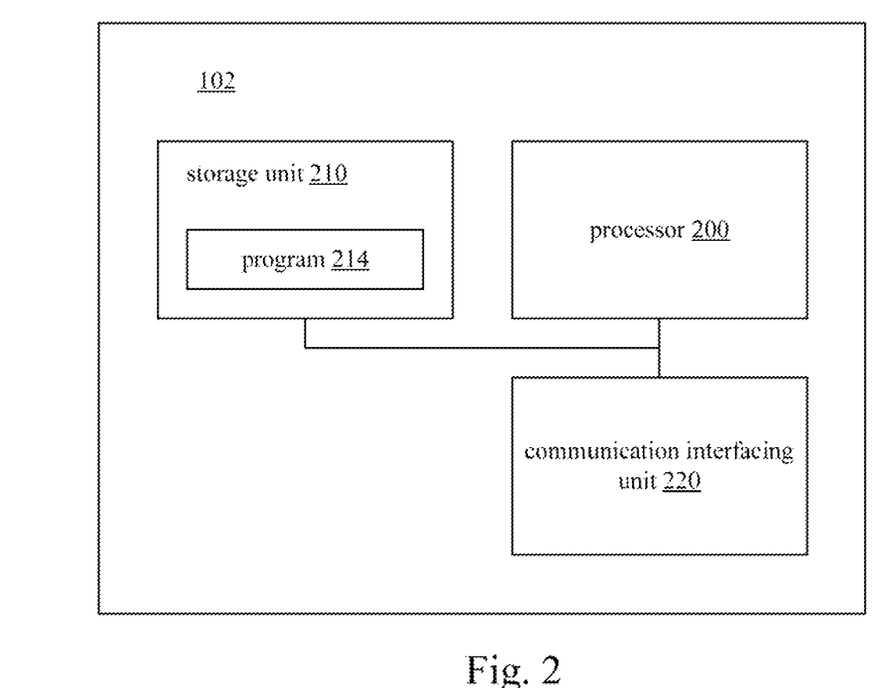
FIG. 2 is a schematic block diagram of a main network node according to one embodiment of the present disclosure.

Reference is made to FIG. 2, which is a schematic diagram of the main network node 102 according to one embodiment of the present disclosure. The main network node 102 may include a processor 200, a storage unit 210, and a communication interfacing unit 220. In one embodiment, the processor 200, the storage unit 210, and the communication interfacing unit 220 are electrically connected to each other. The processor 200 may be a microprocessor or an Application Specific Integrated Circuit (ASIC). The storage unit 210 may be any data storage device that can store a program code (e.g., the program 214) which can be accessed and executed by the processor 200. In one embodiment, the storage unit 210 may be, for example, a read-only memory (ROM), a magnetic tape, a hard disk, and an optical data storage device, but is not limited in this regard. In one embodiment, the communication interfacing unit 220 may be a transceiver and is used to transmit and receive signals (e.g., messages or packets). In some embodiments, the communication interfacing unit 220 may transmit signals according to processing results of the processor 200.

Figure 3:
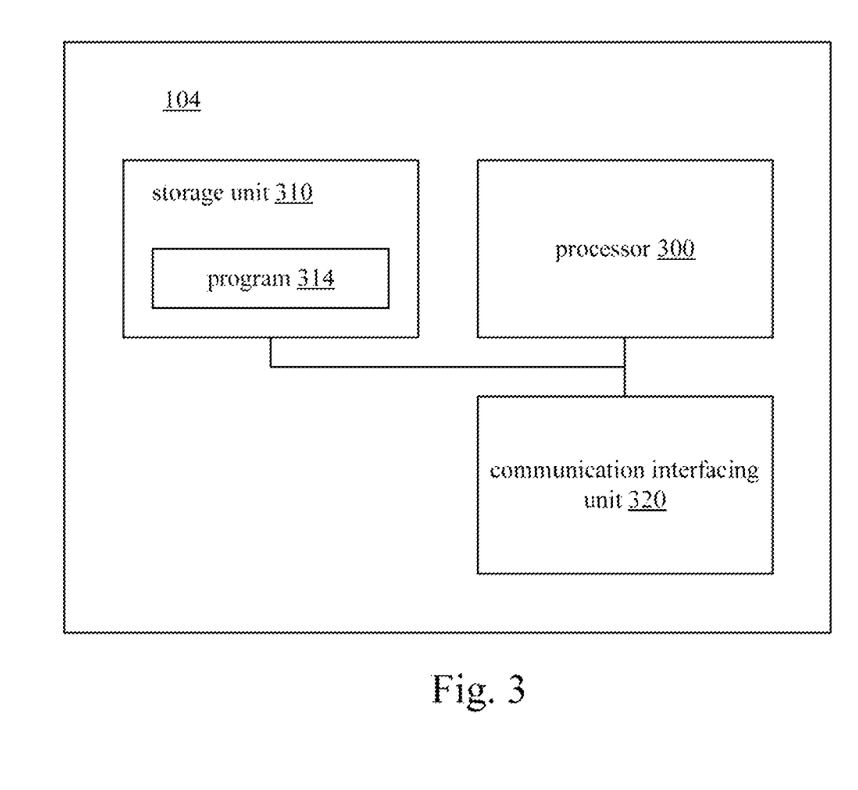
FIG. 3 is a schematic block diagram of an auxiliary network node according to one embodiment of the present disclosure.

Reference is made to FIG. 3, which is a schematic diagram of the auxiliary network node 104 according to one embodiment of the present disclosure. The auxiliary network node 104 may include a processor 300, a storage unit 310, and a communication interfacing unit 320. The processor 300, the storage unit 310, and the communication interfacing unit 320 are electrically connected to each other. In one embodiment, the processor 300 may be a microprocessor or an Application Specific Integrated Circuit (ASIC). In one embodiment, the storage unit 310 may be any data storage device that can store a program code (e.g., the program 314) which can be accessed and executed by the processor 300. In one embodiment, the storage unit 310 may be, for example, a read-only memory (ROM), a magnetic tape, a hard disk, and an optical data storage device, but is not limited in this regard. In one embodiment, the communication interfacing unit 320 may be a transceiver and is used to transmit and receive signals (e.g., messages or packets). In some embodiments, the communication interfacing unit 320 may transmit signals according to processing results of the processor 300.

In one embodiment, a radio protocol architecture is provided for communications of the wireless communication system 10. In the radio protocol architecture, a radio bearer (RB) can be a data radio bearer (DRB) setup for user plane data transmission and/or reception or a signaling radio bearer (SRB) setup for control plane data transmission and/or reception. A DRB configuration includes DRB identity, EPS bearer identity, PDCP configuration (e.g. header compression configuration), RLC configuration, logical channel identity and logical channel configuration (e.g. priority and logical channel group). A SRB configuration includes SRB identity, RLC configuration and logical channel configuration. In dual connectivity, there are three types of radio bearers. MCG bearer, SCG bearer, and split bearer. The MCG bearer utilizes radio protocols only located in the MeNB to use MeNB resources only. The SCG bearer utilizes radio protocols only located in the SeNB to use SeNB resources. The Split bearer utilizes radio protocols located in both the MeNB and the SeNB to use both MeNB and SeNB resources. A DRB can be an MCG bearer, an SCG bearer, or a split bearer. A SRB can be an MCG bearer, an SCG bearer, or a split bearer.

In one embodiment, the main network node 102 is configured for communicating with a communication device 20 via an RRC connection and at least one first RB with a MCG bearer type, to provide a network service. The main network node 102 requests the auxiliary network node 104 to establish at least one second RB with a SCG bearer type between the communication device 20 and an auxiliary network node 104, so that the auxiliary network node 104 communicates with the communication device 20 via the at least one second RB. In addition, the main network node 102 may further release the RRC connection, one of the at least one first RB, and/or one of the at least one second RB.

It should be noted that in the following operations, no particular sequence is required unless otherwise specified. Moreover, the following operations also may be performed simultaneously or the execution times thereof may at least partially overlap.

Figure 4:
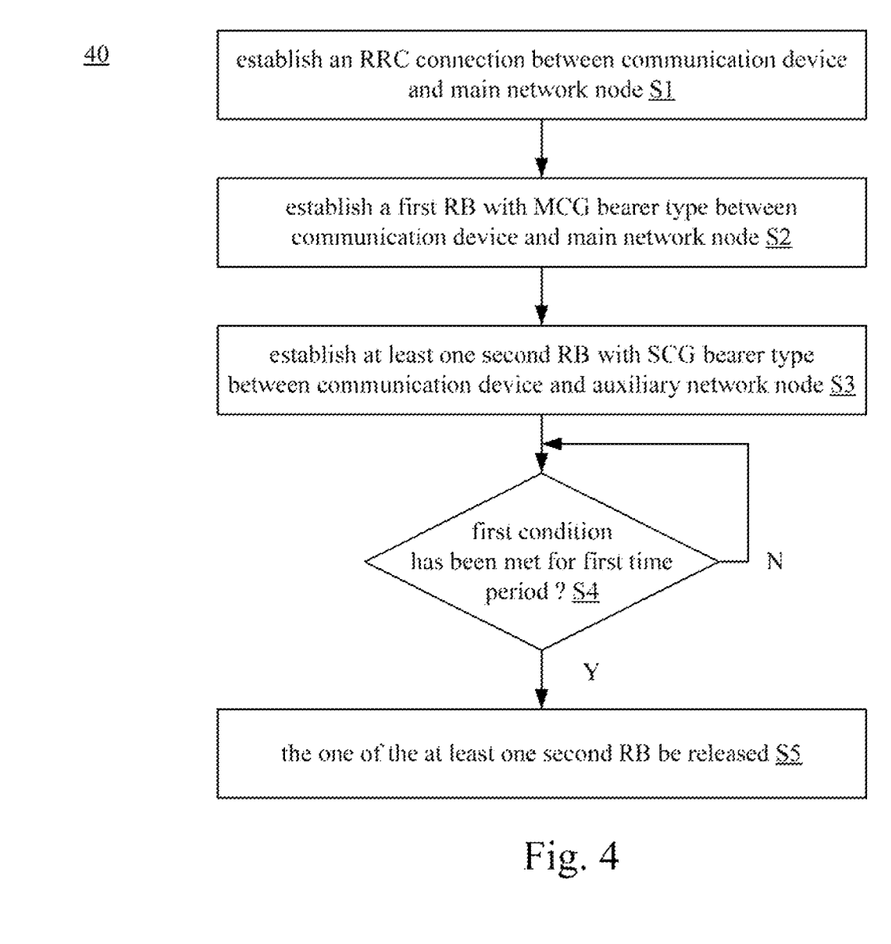
FIG. 4 is a flowchart of a method of a wireless communication system according to one embodiment of the present disclosure.

FIG. 4 illustrates a method 40 including operations of the wireless communication system 10 according to one embodiment of the present disclosure.

In operation S1, the processor 200 of the main network node 102 controls the communication interfacing unit 220 to establish an RRC connection between the communication device 20 and the main network node 102.

In operation S2, the processor 200 of the main network node 102 controls the communication interfacing unit 220 to establish at least one first RB with an MCG bearer type between the communication device 20 and the main network node 102. After the RRC connection and the at least one first RB are established, the processor 200 utilizes the communication interfacing unit 220 to communicate with the communication device 20 via the RRC connection and the at least one first RB.

In operation S3, the processor 200 of the main network node 102 controls the communication interfacing unit 220 to establish at least one second RB with an SCG bearer type between the communication device 20 and the auxiliary network node 104.

In operation S4, it is determined whether a first condition has been met for a first time period. The first condition is that all of downlink data in all of at least one downlink buffer corresponding to one of the at least one second RB is successfully transmitted or all of the at least one downlink buffer corresponding to the one of the at least one second RB is empty, and the auxiliary network node 104 does not receive any request for an uplink grant allocation from the communication device 20. If so, the one of the at least one second RB is released (operation S5). If not, operation S4 is continuously performed.

In one embodiment, the first time period is a predetermined time period. In one embodiment, the processor 300 may control the communication interfacing unit 320 to send a starting signal to the main network node 102 when the auxiliary network node 104 determines the first condition is met. The processor 200 of the main network node 102 may start the first timer in response of receiving the starting signal transmitted from the auxiliary network node 104.

When the auxiliary network node 104 determines a second condition is met, the processor 300 may control the communication interfacing unit 320 to send a stop/restart signal to the main network node 102 to make the processor 200 of the main network node 102 stop or restart the first timer in response of receiving the first stop/restart signal. The second condition is that new downlink data enters the at least one downlink buffer corresponding to the one of the at least one second RB or the auxiliary network node 104 receives a request for an uplink grant allocation from the communication device 20. When the first timer expires, the processor 200 of the main network node 102 may release the one of the at least one second RB (operation S5).

In some embodiments of operation S5, when more than one second RBs are configured between the auxiliary network node 104 and the communication device 20, the processor 200 may perform an MeNB initiated SeNB Modification procedure defined in a file of 3GPP TS 36.300 v12.3.0 to release the one of the at least one second RB described above. In some embodiments, when there is only one second RB (i.e. the one of the at least one second RB) configured between the auxiliary network node 104 and the communication device 20, the processor 200 may perform an MeNB initiated SeNB Release procedure defined in the file of 3GPP TS 36.300 v12.3.0 to release the one of the at least one second RB.

In an alternative embodiment, in operation S4, the processor 300 in the auxiliary network node 104 may start the first timer with the first time period when the auxiliary network node 104 determines the first condition is met. When the auxiliary network node 104 determines the second condition is met, the processor 300 may stop or restart the first timer. When the first timer expires, the processor 300 may release the one of the at least one second RB (operation S5). The first time period may be sent by the main network node 102 or a core network to the auxiliary network node 104 or predetermined by the auxiliary network node 104.

In some embodiments of operation S5, when more than one second RBs are configured between the auxiliary network node 104 and the communication device 20, the processor 300 may perform an SeNB initiated SeNB Modification procedure defined in the file of 3GPP TS 36.300 v12.3.0 to release the one of the at least one second RB described above. In some embodiments, when there is only one second RB (i.e., the one of the at least one second RB) configured between the auxiliary network node 104 and the communication device 20, the processor 300 may perform an SeNB initiated SeNB Release procedure defined in the file of 3GPP TS 36300 v12.3.0 to release the one of the at least one second RB.

Figure 5:
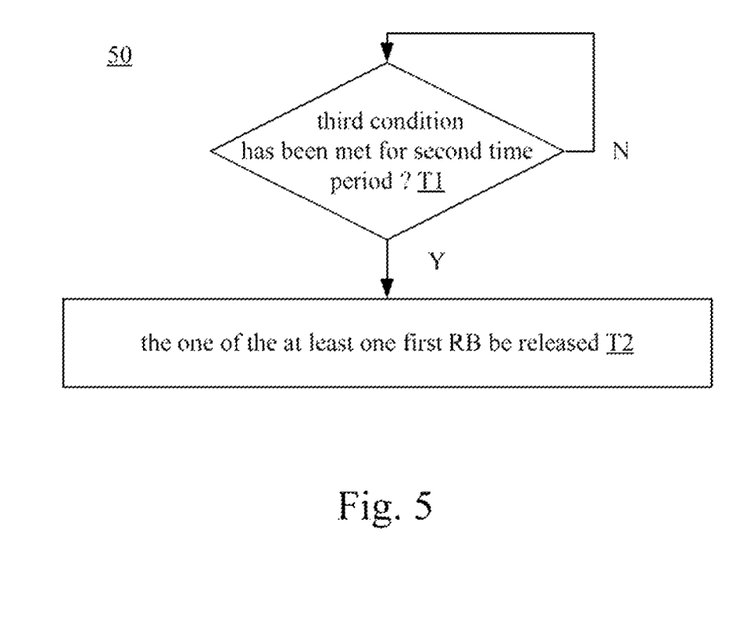
FIG. 5 is a flowchart of a method of a wireless communication system according to another embodiment of the present disclosure.

FIG. 5 illustrates a method 50 including operations of the wireless communication system 10 according to one embodiment of the present disclosure.

In this operative example, an RRC connection and at least one first RB with an MCG bearer type are established between the communication device 20 and the main network node 102, and the processor 200 can utilize the communication interfacing unit 220 to communicate with the communication device 20 via the RRC connection and the at least one first RB.

In operation T1, the processor 200 of the main network node 102 determines whether a third condition has been met for a second time period. The third condition is that all of downlink data in all of at least one downlink buffer corresponding to one of the at least one first RB is successfully transmitted or all of the at least one downlink buffer corresponding to the one of the at least one first RB is empty, and the main network node 102 does not receive any request for an uplink grant allocation from the communication device 20. If so, the one of the at least one first RB is released (operation T2). If not, operation T1 is continuously performed.

In one embodiment, the processor 200 may transmit an RRCConnectionReconfiguration message to the communication device 20 to release the one of the at least one first RB. In one embodiment, the second time period is a predetermined time period. In one embodiment, the second time period may be same as or different from the first time period described above.

In one embodiment, in operation T1 described above, the processor 200 may start a second tinier with the second time period when the main network node 102 determines the third condition is met. When the main network node 102 determines a fourth condition is met, the processor 200 may stop or restart the second timer. The fourth condition is that new downlink data enters the at least one downlink buffer corresponding to the one of the at least one first RB or receives a request for an uplink grant allocation. When the second timer expires, the processor 200 may release the one of the at least one first RB (operation T2).

Figure 6:
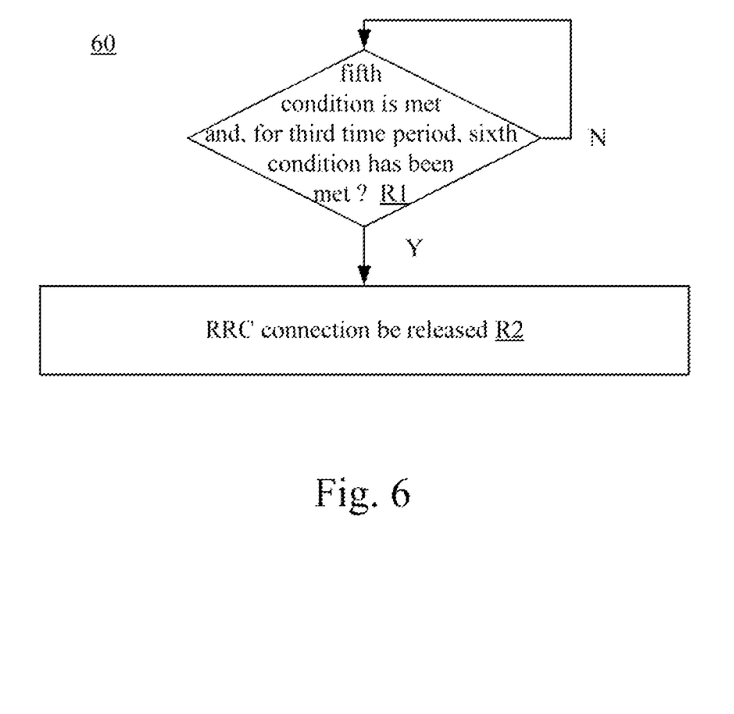
FIG. 6 is a flowchart of a method of a wireless communication system according to still another embodiment of the present disclosure.

FIG. 6 illustrates a method 60 including operations of the wireless communication system 10 according to one embodiment of the present disclosure.

In this operative example, n RRC connection and at least one first. RB with an MCG bearer type are established between the communication device 20 and the main network node 102, and the processor 200 can utilize the communication interfacing unit 220 to communicate with the communication device 20 via the RRC connection and the at least one first RB.

In operation R1, the processor 200 of the main network node 102 determines whether a fifth condition is met and, for a third time period, a sixth condition has been met. The fifth condition is that no second RB with an SCG bearer type is configured between the communication device 20 and the auxiliary network node 104 (e.g., all of the at least one second RB between the communication device 20 and the auxiliary network node 104 as described above is released or has not been established yet). The sixth condition is that all of downlink data in all of at least one downlink buffer corresponding to all of the at least one first RB is successfully transmitted or all of the at least one downlink buffer corresponding to all of the at least one first RB is empty, and the main network node 102 does not receive any request for an uplink grant allocation from the communication device 20. If so, the RRC connection is released (operation R2). If not, operation R1 is continuously performed.

In one embodiment, the third time period is a predetermined time period. In one embodiment, the third time period may be same as or different from the second time period and the first time period described above. In one embodiment, the processor 200 may transmit an RRCConnectionRelease message to the communication device 20 to release the RRC connection.

In one embodiment, in operation R1 described above, the processor 200 may start a third timer with the third time period when the main network node 102 determines the sixth condition is met.

When the main network node 102 determines new downlink data enters one of the at least one downlink buffer corresponding to all of the at least one first RB or receives a request for an uplink grant allocation from the communication device 20, the processor 200 may stop or restart the third timer. When the main network node 102 determines to establish a second RB with an SCG bearer type configured between the communication device 20 and the auxiliary network node 104, the processor 200 may stop or restart the third timer. When the fifth condition is met and the third timer expires, the processor 200 may release the RRC connection (operation R2).

Noted that, in some embodiments, the methods 40, 50, 60 can be combined together. For example, the operations R1, R2 may be performed after operation S5 or between operations S1, S3. In addition, the operations T1, T2 may be performed after operation S2. In some embodiment, the methods 40, 50, 60 can be performed simultaneously or the execution times thereof may at least partially overlap.

Note that, in the embodiments described above, the request for an uplink grant allocation described above may be a scheduling request or a buffer status report which indicates the communication device 20 has uplink data to transmit. The buffer status report may include uplink data volume of the at least one second RB. In the description above, the downlink buffer corresponding to a RB is configured to (temperately) store downlink data to be transmitted to the communication device 20 by the auxiliary network node 104 via the RB.

Although the present invention has been described in considerable detail with reference to certain embodiments thereof, other embodiments are possible. Therefore, the scope of the appended claims should not be limited to the description of the embodiments contained herein.

What is claimed is:

1. A network node comprising:
  a communication interfacing unit configured for communicating with a communication device via a radio resource control (RRC) connection and at least one first radio bearer (RB) with a master cell group (MCG) bearer type; and
  a processor electrically connected with the communication interfacing unit, the processor operable to perform operations comprising:
  controlling the communication interfacing unit to establish at least one second RB with a secondary cell group (SCG) bearer type between the communication device and an auxiliary network node; and
  receiving a starting signal from the auxiliary network node that a first condition is met; and
  releasing one of the at least one second RB when it is determined that the first condition has been met for a first time period, wherein the first condition is that all of downlink data in all of at least one downlink buffer corresponding to the one of the at least one second RB is successfully transmitted or all of the at least one downlink buffer corresponding to the one of the at least one second RB is empty, and the auxiliary network node does not receive any request for an uplink grant allocation from the communication device.

2. The network node as claimed in claim 1, wherein releasing the one of the at least one second RB when it is determined that the first condition has been met comprising:
  starting a timer with the first time period when it is determined that the first condition is met; and
  releasing one of the at least one second RB when the timer expires.

3. The network node as claimed in claim 2, wherein the processor is further operable for:
  stopping or restarting the timer when new downlink data enters the at least one downlink buffer corresponding to the one of the at least one second RB.

4. The network node as claimed in claim 2, wherein the processor is further operable for:
  stopping or restarting the timer when the auxiliary network node receives a request for an uplink grant allocation.

5. The network node as claimed in claim 1, wherein the processor is further operable for:
  releasing one of the at least one first RB when the processor determines that a second condition has been met for a second time period, wherein the second condition is that all of downlink data in at least one downlink buffer corresponding to the one of the at least one first RB is successfully transmitted or the at least one downlink buffer corresponding to the one of the at least one first RB is empty, and the network node does not receive any request for an uplink grant allocation from the communication device.

6. The network node as claimed in claim 1, wherein the processor is further operable for:
  releasing the RRC connection when no second RB between the communication device and the auxiliary network node is configured, and, for a third time period, all of downlink data in all of at least one downlink buffer corresponding to all of the at least one first RB is successfully transmitted or all of the at least one downlink buffer corresponding to all of the at least one first RB is empty, and the network node does not receive any request for an uplink grant allocation from the communication device.

7. A network node comprising:
  a communication interfacing unit configured for communicating with a communication device via an RRC connection and at least one RB with an MCG bearer type; and
  a processor electrically connected with the communication interfacing unit, the processor operable to perform operations comprising:
  controlling the communication interfacing unit to establish at least one second RB with a secondary cell group (SCG) bearer type between the communication device and an auxiliary network node; and
  releasing the RRC connection when the processor determines that a first condition is met and for a first time period, a second condition has been met, wherein the first condition is that no second RB with an the SCG bearer type is configured between the communication device and an auxiliary network node, and the second condition is that all of downlink data in all of at least one downlink buffer corresponding to all of the at least one first RB is successfully transmitted or all of the at least one downlink buffer corresponding to all of the at least one first RB is empty, and the network node does not receive any request for an uplink grant allocation from the communication device.

8. The network node as claimed in claim 7, wherein releasing the RRC connection when the network node determines that the first condition is met and for the first time period, the second condition has been met comprising:
  starting a timer with the first time period when the second condition is met; and
  releasing the RRC connection when the first condition is met and the timer expires.

9. The network node as claimed in claim 8, wherein the processor is further operable for:
  stopping or restarting the timer when new downlink data enters the at least one downlink buffer corresponding to all of the at least one first RB.

10. The network node as claimed in claim 8, wherein the processor is further operable for:
   stopping or restarting the timer when the network node receives a request for an uplink grant allocation.

11. The network node as claimed in claim 7 wherein the processor is further operable for:
   releasing one of the at least one first RB when the processor determines that a third condition has been met for a second time period, wherein the third condition is that all of the downlink data in at least one downlink buffer corresponding to the one of the at least one first RB is successfully transmitted or the at least one downlink buffer corresponding to the one of the at least one first RB is empty, and the network node does not receive any request for an uplink grant allocation from the communication device.

* * * * *